United States Patent [19]

Gjertsen

[11] 4,132,188

[45] Jan. 2, 1979

[54] DEVICE FOR SECURING ELEMENTS TO A TAPERED SHAFT

[75] Inventor: Leroy E. Gjertsen, Buffalo Grove, Ill.

[73] Assignee: General Signal Corporation, Rochester, N.Y.

[21] Appl. No.: 844,998

[22] Filed: Oct. 25, 1977

[51] Int. Cl.² .................... F16D 1/06; G01D 13/22
[52] U.S. Cl. .................................. 116/332; 29/432; 116/DIG. 6; 403/371
[58] Field of Search .......... 116/136.5, 129 F, DIG. 6; 58/126 D; 324/154 PB; 29/243, 365, 432; 403/371, 365

[56] References Cited

U.S. PATENT DOCUMENTS

| | | | |
|---|---|---|---|
| 2,255,003 | 9/1941 | Rodanet | 116/136.5 |
| 2,702,087 | 2/1955 | Beier | 29/453 X |
| 2,735,068 | 2/1956 | Wolferz | 58/126 D X |
| 2,761,415 | 9/1956 | Waite | 116/136.5 |
| 2,890,416 | 6/1959 | Walker | 116/136.5 X |
| 3,130,705 | 4/1964 | Ingham | 116/136.5 |
| 3,374,765 | 3/1968 | Preiser | 116/136.5 X |
| 3,996,881 | 12/1976 | Schneider | 73/431 X |

*Primary Examiner*—Daniel M. Yasich

*Attorney, Agent, or Firm*—Jeffrey S. Mednick; Harold Huberfeld

[57] ABSTRACT

A gauge movement includes a tapered plastic output shaft having a member disposed symetrically thereabout. The member has first and second ends and a conical inner surface disposed about and adapted to receive the tapered plastic output shaft. The conical inner surface extends substantially from the first end to the second end and defines a conical bore through the member. The bore has a first inside diameter at the first end and a second inside diameter, smaller than the first inside diameter, at the second end. The member is further provided with a stepped outer surface having a first outside diameter at the first end and a second outside diameter, larger than the first outside diameter, at the second end. The member further includes at least one slot for deforming the tapered plastic output shaft when the member is forced into engagement with the shaft, to thereby prevent relative rotational movement between the member and the shaft. The slot extends radially from the inner surface to the outer surface and extends axially from the first end toward the second end. A pointer surrounds the member and is secured thereto.

7 Claims, 4 Drawing Figures

DEVICE FOR SECURING ELEMENTS TO A TAPERED SHAFT

BACKGROUND OF THE INVENTION

The present invention relates generally to devices for securing elements to tapered shafts and more particularly to a device for securing a pointer to the tapered plastic output shaft of a gauge movement.

It is well known in the manufacture of gauges that a pointer may be affixed to the output shaft of the gauge movement by affixing the pointer to a bushing and in turn mounting the bushing on the movement output shaft. Many gauge movements have tapered plastic output shafts, and in the past, in mounting bushings on the ends of such tapered plastic shafts it has been necessary to use adhesive to bind the bushing to the shaft. This technique has had certain disadvantages. Primarily, a significant percentage of gauge pointer assemblies have, in time, become disengaged from the movement output shaft. Additionally, in those instances where it has been necessary to remove the pointer assembly to service the gauge, it has usually been necessary to replace the pointer assembly or to clean the adhesive off of the bushing and the output shaft before reassembling the gauge.

SUMMARY OF THE INVENTION

The present invention overcomes the aforementioned problems by providing a gauge movement which includes a tapered plastic output shaft having a member disposed symmetrically thereabout. The member has first and second ends and a conical inner surface disposed about and adapted to receive the tapered plastic output shaft. The conical inner surface extends substantially from the first end to the second end and defines a conical bore through the member. The bore has a first inside diameter at the first end and a second inside diameter, smaller than the first inside diameter, at the second end. The member is further provided with a stepped outer surface having a first outside diameter at the first end and a second outside diameter, larger than the first outside diameter, at the second end. The member further includes at least one slot for deforming the tapered plastic output shaft when the member is forced into engagement with the shaft, to thereby prevent relative rotational movement between the member and the shaft. The slot extends radially from the inner surface to the outer surface and extends axially from the first end toward the second end. A pointer surrounds the member and is secured thereto.

OBJECTS OF THE INVENTION

Accordingly, an object of the present invention is the provision of a device for securing elements to a tapered shaft which eliminates the need for adhesives.

Another object of the present invention is the provision of a device for securing elements to a tapered shaft in such a manner that the device may be later removed from and resecured to the shaft.

A further object of the present invention is the provision of a pointer assembly which may be readily secured to a tapered shaft without the use of adhesives.

Still another object of the present invention is the provision of a pointer assembly which may be readily removed from and resecured to a tapered shaft.

A still further object of the present invention is the provision of a device for securing elements to a tapered shaft which is both economical to use and inexpensive to manufacture.

Other objects, advantages, and novel features of the present invention will become apparent from the following detailed description of the invention when considered in conjunction with the accompanying drawings.

DESCRIPTION OF THE PREFERRED EMBODIMENT

Figure 1:
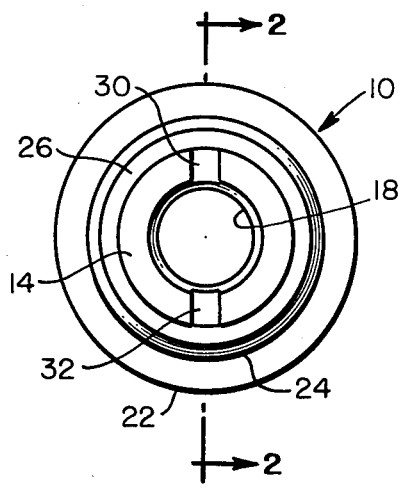
FIG. 1 shows a rear view of the device of the present invention.
Figure 2:
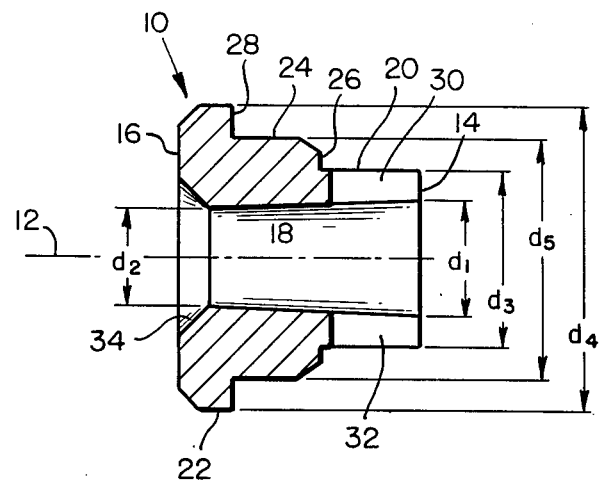
FIG. 2 shows a cross-sectional view taken along lines 2—2 of FIG. 1.

A device for securing elements to a tapered shaft will now be described in detail in connection with FIGS. 1 and 2. The device is in the shape of a bushing and includes a member 10 disposed symetrically about a longitudinal axis 12. The member 10 includes a first end 14 and a second end 16. The member 10 further includes a conical inner surface 18 disposed about the axis 12 and extending substantially from the end 14 to the end 16. This conical inner surface 18 defines a conical bore through the member 10. The bore has a first inside diameter $d_1$ at the end 14 and a second inside diameter $d_2$ at the end 16. $d_1$ is greater than $d_2$ in order to create the desired taper for the bore. The exact relationship between $d_1$ and $d_2$ will be determined, of course, by the dimensions of the tapered shaft to which the member is to be secured.

The member 10 includes a stepped outer surface and a first portion 20 adjacent the end 14. The portion 20 preferably has a right circular cylindrical outer surface having an outside diameter $d_3$. The member 10 also includes a second portion 22 adjacent the end 16. The portion 22 includes a right circular cylindrical outer surface having an outside diameter $d_4$. The diameter $d_4$ of portion 22 is larger than the diameter $d_3$ of portion 20. The member 10 further includes a portion 24 between the portion 20 and the portion 22. The portion 24 also has a right circular cylindrical outer surface and has an outside diameter $d_5$ which is larger than $d_3$ but smaller than $d_4$. The portion 20 is separated from the portion 24 by a shoulder 26. Likewise, the portion 22 is separated from the portion 24 by a shoulder 28.

The portion 20 further includes a pair of diametrically opposed slots 30 and 32 which extend radially from the inner surface 18 to the outer surface, and extend axially from the end 14 toward the end 16 for substantially the entire axial length of the portion 20. Although two diametrically opposed slots are preferred, it should be understood that the number and the position of the slots in the portion 20 may vary to achieve maximum gripping of a tapered shaft inserted in the bore 18, while retaining sufficient strength in the portion 20.

Figure 3:
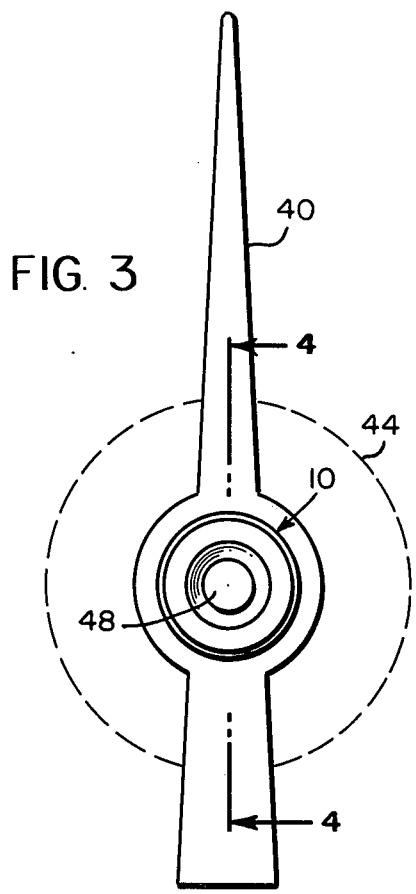
FIG. 3 shows a front view of a gauge movement employing the pointer assembly of the present invention.
Figure 4:
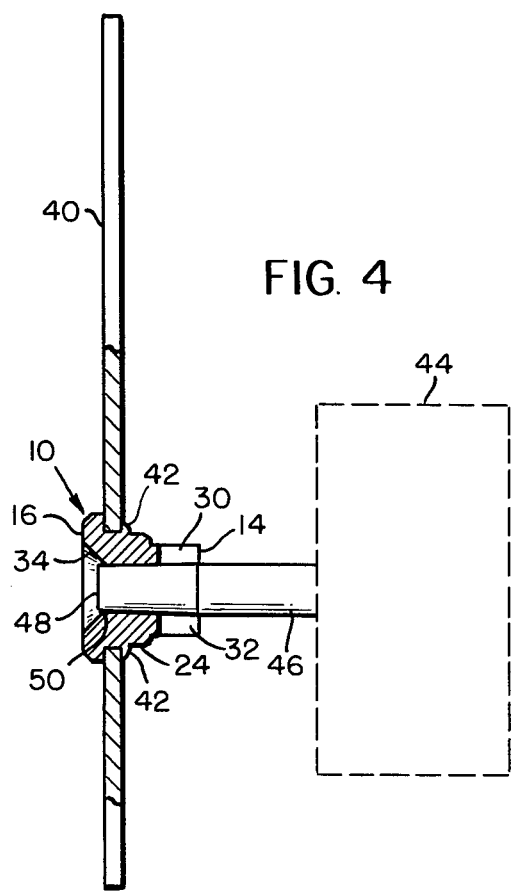
FIG. 4 shows a partial cross-sectional view taken along lines 4—4 of FIG. 3.

The member 10 further includes a countersunk portion 34 on the end 16 so that the bore 18 flares out adjacent the end 16. The importance of the configuration of the member 10 will become more apparent in the consideration of the pointer assembly for a gauge movement shown in FIGS. 3 and 4.

A standard gauge pointer 40 surrounds the portion 24 of the member 10 and abuts the shoulder 28. The pointer 40 may be secured to the member 10 by any suitable means, for example, by staking as shown at 42.

A gauge movement graphically illustrated at 44 includes a tapered plastic output shaft 46. The member 10 is forced into engagement with the shaft 46 in a known manner with the end 14 of member 10 being axially closest to the gauge movement 44. When the member 10 is forced into engagement with the tapered plastic output shaft 46, the slots 30 and 32 deform the plastic slightly to thereby prevent relative rotational movement between the member 10 and the tapered plastic output shaft 46.

The member 10 is forced onto the tapered plastic output shaft 46 until the end 48 of the shaft 46 is approximately coplanar with the end 16 of member 10. Although a certain degree of tolerance is permissible, it is important that the end 48 of shaft 46 extend axially beyond the bottom portion 50 of the countersunk portion 34. This enables the portion of shaft 46 adjacent the end 48 to expand into the countersunk portion of 34 and prevent relative axial movement between the member 10 and the shaft 46. The member 10 may be made from any one of a number of hard materials and is preferably made of aluminum.

Accordingly, it is apparent, that a device has been provided for securing elements to a tapered shaft which eliminates the end for adhesives. The slots 30 and 32 provide resistance to relative rotational movement between a shaft and the member 10 and the countersunk portion 34 provides resistance to relative axial movement between the shaft 46 and the member 10. Furthermore, since adhesives are not needed to secure the member 10 to the shaft 46, the member 10 may later be removed with proper tools and subsequently resecured to the shaft 46. The need for cleaning adhesives off the mating surfaces of a bushing and a shaft has been obviated by the present invention. Thus, the device of the present invention is both economical to use and, as is apparent from its simple structure, inexpensive to manufacture.

While there has been described what is at present considered to be the preferred embodiment of the present invention, it will be obvious to those skilled in the art that various changes and modifications may be made therein without departing from the invention, and it is, therefore, deemed in the appendant claims to cover all such changes and modificationsas fall within the true spirit and scope of the invention.

What we claim is:

1. In a pointer assembly including a tapered plastic shaft having a pointer secured thereto, the improvement comprising:
    (a) a member having sufficient hardness to deform said tapered plastic shaft disposed symmetrically about said tapered plastic shaft, said member having:
        (1) first and second ends;
        (2) a conical inner surface disposed about and adapted to receive said tapered plastic shaft, said conical inner surface extending substantially from said first end to said second end and defining a conical bore through said member, said bore having a first inside diameter at said first end and a second inside diameter, smaller than said first inside diameter, at said second end, wherein said tapered plastic shaft extends beyond said second end of said conical bore, whereby said member and said tapered plastic shaft are maintained in a fixed axial relationship;
        (3) a stepped outer surface having a first outside diameter at said first end and a second outside diameter, larger than said first outside diameter at said second end; and
        (4) at least one slot for deforming said tapered plastic shaft within elastic limits of the plastic material of the shaft when said member is forced into engagement with said tapered plastic shaft, to thereby prevent relative rotational movement between said member and said tapered plastic shaft, said slot extending radially from said inner surface to said outer surface and extending axially from said first end to a point intermediate said first and second ends; and
    (b) said pointer surrounding said member and secured thereto.

2. A pointer assembly as set forth in claim 1 wherein said stepped outer surface includes a portion between said first end and said second end having a third outside diameter, said third outside diameter being larger than said first outside diameter but smaller than said second outside diameter.

3. A pointer assembly as set forth in claim 2 wherein said pointer surrounds said portion having a third outside diameter and abuts that portion of said member having a second outside diameter.

4. A pointer assembly as set forth in claim 2 wherein said slot is contained entirely in that portion of said member having said first outside diameter.

5. A pointer assembly as set forth in claim 1 wherein said member further includes a countersunk portion on the second end thereof to permit the end of the tapered shaft to expand thereby preventing relative axial movement between said member and said tapered plastic shaft.

6. A pointer assembly as set forth in claim 1 including a pair of diametrically opposed slots extending radially from said inner surface to said outer surface and extending axially from said first end towards said second end.

7. In a gauge movement including a tapered plastic output shaft having a pointer secured thereto, the improvement comprising:
    (a) a member having sufficient hardness to deform said tapered plastic output shaft disposed symmetrically about said tapered plastic output shaft, said member having;
        (1) first and second ends:
        (2) a conical inner surface disposed about and adapted to receive said tapered plastic output shaft, said conical inner surface extending substantially from said first end to said second end and defining a conical bore through said member, said bore having a first inside diameter at said first end and a second inside diameter, smaller than said first inside diameter, at said second end, wherein said tapered plastic shaft extends beyond said second end of said conical bore, whereby said member and said tapered plastic shaft are maintained in a fixed axial relationship;
        (3) a stepped outer surface having a first outside diameter at said first end and a second outside diameter, larger than said first outside diameter at said second end; and (4) at least one slot for deforming said tapered plastic output shaft within elastic limits of the plastic material of the shaft when said member is forced into engagement with said tapered plastic output shaft, to thereby prevent relative rotational movement between said member and said tapered plastic output shaft, said slot extending radially from said inner surface to said outer surface and extending axially from said first end to a point intermediate said first and second ends; and (b) said pointer surrounding said member and secured thereto.

* * * * *